Sept. 28, 1926.  
J. CROUCH  
VEHICLE SNUBBER  
Filed May 4, 1926  
1,601,110  
2 Sheets-Sheet 1
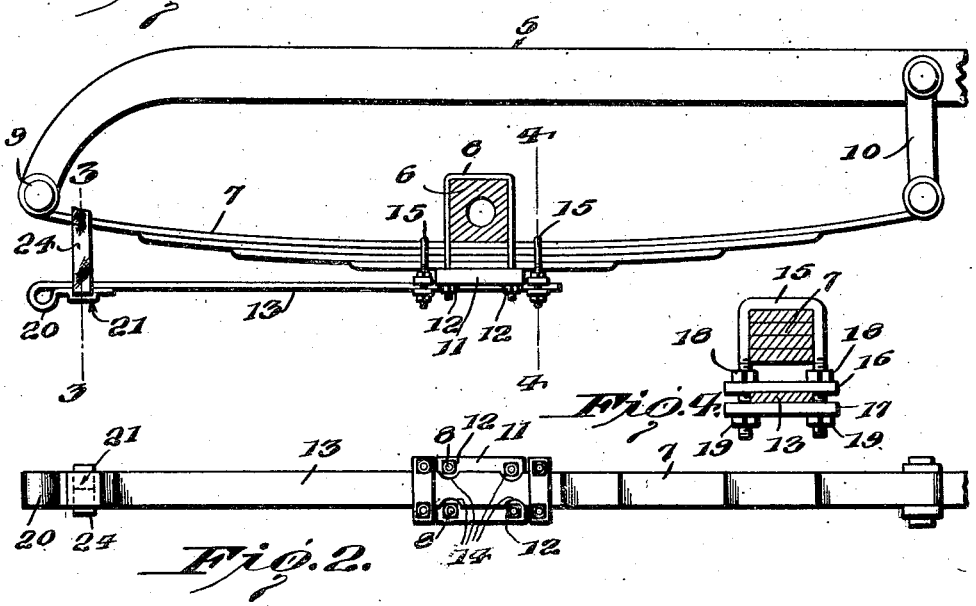
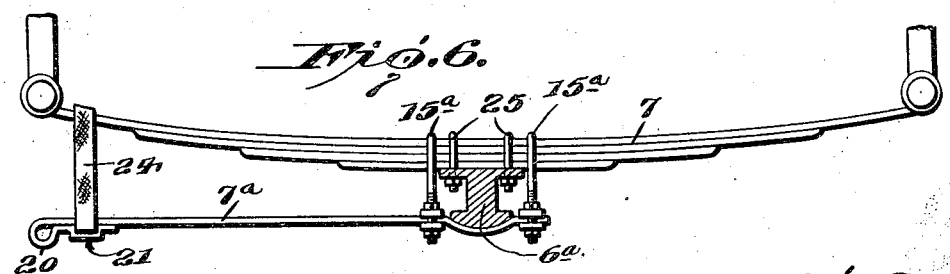
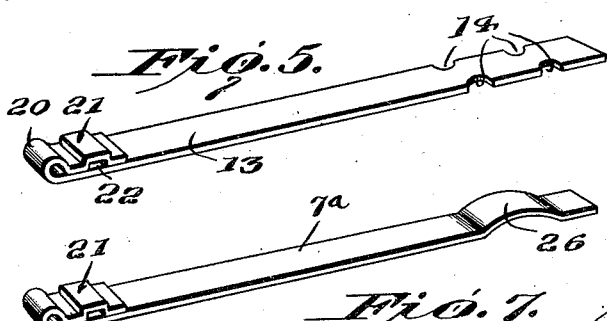
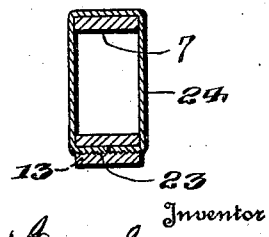
Inventor  
John Crouch  
By L. Harold Sothoron  
Attorney

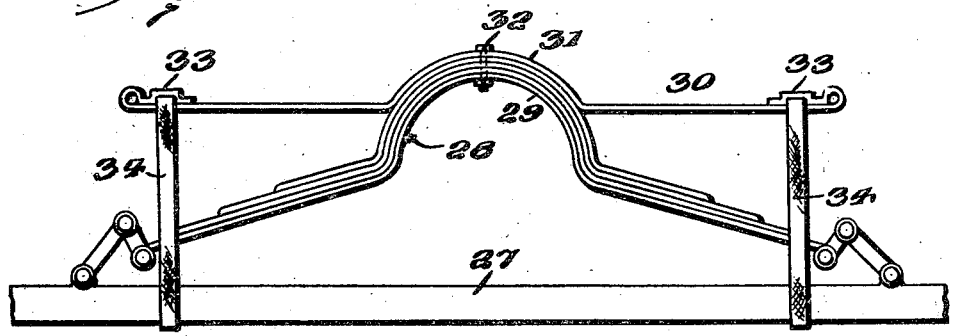
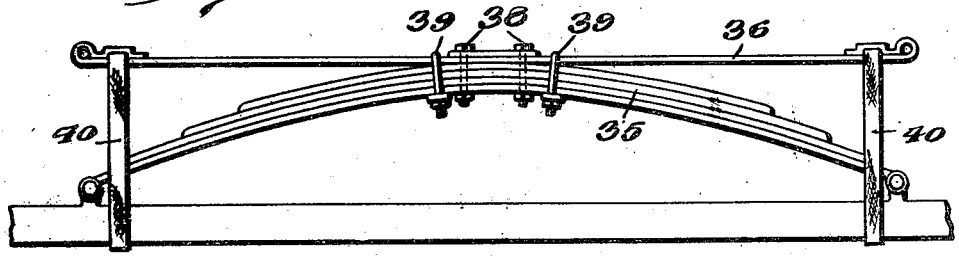
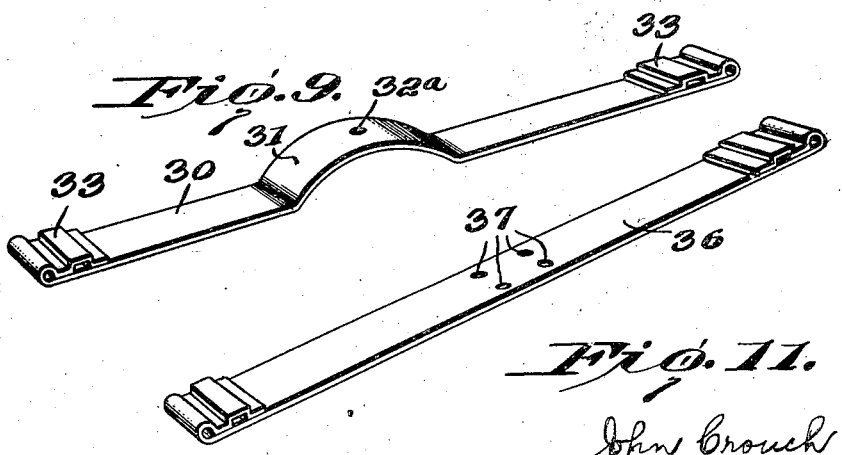

Patented Sept. 28, 1926.

1,601,110

UNITED STATES PATENT OFFICE.

JOHN CROUCH, OF LIGONIER, PENNSYLVANIA.

VEHICLE SNUBBER.

Application filed May 4, 1926. Serial No. 106,693.

This invention relates to improvements in vehicle snubbers and has for its principal object to provide an attachment for vehicle springs of motor vehicles by which the rebound action of the spring will be checked.

Another object of the invention is to provide a snubber for the purpose described which may be readily applied to leaf springs of motor vehicles now in use, and which is extremely simple in structure and is therefore cheap to manufacture.

With these and other objects in view which will more fully appear and the nature of the invention will be more clearly understood by following the description, the appended claims, and the several views illustrated in the accompanying drawings.

In the accompanying drawings which show several forms of my invention:

Figure 1 is a side elevation showing the application of my improved snubber to the leaf spring of a vehicle which extends lengthwise of the vehicle, Figure 2 is a bottom plan view thereof, Figure 3 is a detailed sectional view taken on the line 3—3 of Figure 1, Figure 4 is a detailed sectional view taken on line 4—4 of Figure 1, Figure 5 is a perspective view of the spring arm forming a part of the snubber as shown in Figure 1, Figure 6 is a side elevation showing another form of my invention the same being applied to a different type of vehicle leaf spring which however extends lengthwise of the vehicle, Figure 7 is a perspective view of the spring arm forming a part of the snubber shown in Figure 6, Figure 8 is a side elevation of a vehicle spring extending transversely of the vehicle and showing the application of a modified form of my invention applied thereto, Figure 9 is a perspective view of the spring arm forming a part of the snubber shown in Figure 8, Figure 10 is a view similar to Figure 8 but showing a slightly different form of vehicle spring and a slightly different construction of a snubber spring applied thereto, and Figure 11 is a perspective view of the spring arm forming a part of the snubber shown in Figure 10.

Like numerals designate corresponding parts throughout the several figures of the drawings.

By reference to Figure 1 of the accompanying drawings, it will be seen that I have indicated a vehicle frame by the numeral 5, the axle by the numeral 6, and the leaf spring by the numeral 7, the latter being secured to the axle by means of U-bolts 8. The leaf spring 7 extends lengthwise of the frame 5 and one end thereof is pivotally connected to the frame as at 9, the other end being pivotally connected to the frame through the medium of a link 10.

There is a pair of U-bolts 8 associated with each leaf spring 7, the legs of the U-bolts extending on opposite sides of the leaf spring. A relatively thick plate 11 is disposed under the leaf spring and projects beyond the side thereof. The extended portions of the plate 11 are formed with openings to receive the legs of the U-bolts 8, and clamping nuts 12 are associated with the lower ends of the legs of the U-bolts for securing the leaf spring 7 to the axle 6.

My improved snubber includes a flat metallic spring arm 13 which is positioned on the underside of the leaf spring 7 and has its inner end fixedly secured thereto. The inner end of the arm 13 bears against the under surface of the plate 11, and said inner end is formed with a plurality of marginal recesses 14 to permit the nuts 12 to be freely turned. It will be noted that the spring arm 13 is substantially of the same width as the leaf spring 7. The inner end of the spring arm 13 projects beyond the clamping plate 11 and associated with said spring arm on opposite sides of said clamping plate 11 are fastening means for adjustably securing the spring arm to the leaf spring 7. These clamping means consist of two U-bolts 15—15 which embrace the leaf spring 7 and extend downwardly against the side faces thereof to a point below the spring arm 13. Upper and lower clamping plates 16 and 17 respectively are disposed against the upper and lower faces of the spring arm 13 and are each formed with a pair of openings to receive the legs of the associated U-bolt 15. Upper clamping nuts 18—18 are threaded on to the legs of each U-bolt 15 and serve to limit the upward movement of the plates 16 and 17 and the spring arm 13. Lower clamping nuts 19—19 are threaded on to the lower ends of the legs of the U-bolt 15 below the clamping plate 17 and serve to clamp the plates 16 and 17 and the spring arm 13 against the clamping nuts 18.

The outer end or free end of the spring arm 13 is substantially co-extensive with the adjacent end of the spring arm 7. The outer end of the arm 13 is rebent to form a tension loop 20 and a clamping or gripping arm 21. The clamping arm 21 is bent intermediate its ends to form a transverse seat 22 having a roughened surface 23. A flexible strap 24 is looped over the leaf spring 7 and the end portions of the strap are inserted within the seat 22, the meeting ends being disposed in abutting relation. The depth of the seat 22 is of course considerably less than the thickness of the strap and consequently the arm 21 will engage and firmly clamp the end portions of the strap. This gripping action is greatly increased by reason of the roughened surface 23 of the seat 22.

In order to attach the snubber to the vehicle, it is only necessary to attach the inner end of the arm 13 by means of the U-bolts 15, clamping plates 16 and 17, and nuts 18 and 19, pry open the clamping jaw 21, by means of a screw driver or other suitable tool, loop the strap 24 around the leaf spring 7 and insert the end portions of the strap in the seat 22, and finally release the clamping jaw 21.

From the foregoing it will be observed that more or less tension can be applied to the snubber arm 13 by adjusting the nuts 18 and 19 on either or both of the U-bolts 15. It will also be noted that the spring arm 13 is held against lateral and also longitudinal movements relative to the leaf spring 7 by means of the U-bolts 15 and their associated clamping devices.

In the form illustrated in Figures 6 and 7, the axle 6ª is disposed below the spring arm 7 and the clamping bolts 25 do not extend below the axle. The spring arm 7ª is substantially identical with the spring arm 7 except that at its inner end it is devoid of any marginal recesses but is formed with a downwardly extending bowed portion 26 for fitting the lower curved edge of the axle 6ª. U-bolts 15ª—15ª, similar to the U-bolts 15 are associated with the leaf spring 7 and with the inner end of the spring arm 7ª. Similar clamping means are provided for securing the U-bolts 15ª to the spring arm 7ª.

In the form illustrated in Figures 8 and 9, I have shown an axle 27 and a vehicle leaf spring 28 connected thereto and arranged longitudinally thereof. The spring includes an upwardly extending curved portion 29. In this form the vehicle snubber includes a flat metallic spring arm 30 which is co-extensive with the spring arm 28 and is centrally formed with an upwardly extending bow portion 31 which fits the curved portion 29 of the leaf spring. The arm 30 is fixedly secured to the spring by means of a bolt 32 which passes through an opening 32ª in the curved portion 31. Each end of the arm 30 is formed with a clamping or gripping arm 33, each gripping arm being of a construction identical with the gripping arm 21 shown in Figures 1 to 5. Flexible straps 34—34, similar to the straps 24, are looped around and under the axle 27 and have their end portions clamped to the snubber arm 30 by means of the clamping or gripping arms 33.

In the construction shown in Figures 10 and 11, I have illustrated a leaf spring 35 which however is devoid of an upwardly extending curved portion such as is illustrated in Figure 8. In this form, the snubber arm 36 is formed from a flat spring arm. The central portion is formed with a plurality of openings 37 for receiving the bolts 38 which extend not only through the spring arm 36 but also through the leaf spring 35. U-bolts 39—39 are respectively disposed on opposite sides of the bolts 38 and surround both the leaf spring 35 and the spring arm 36 and functions to increase or decrease the tension of each end of the spring arm 36. Flexible straps 40—40 are connected with the outer ends of the spring arm 36 and with the spring leaf 35 in the same manner as illustrated heretofore in connection with the other forms of my invention.

It is of course to be understood that the details of structure and arrangements of parts may be variously changed and modified without departing from the spirit and scope of my invention.

What I claim is:

1. In a snubber attachment for vehicles, a flat spring snubber arm adapted for attachment to the center portion of a vehicle flat leaf spring, the free end of the arm being rebent to form a clamp, and a flexible rebound limiting strap adapted for connection with a part of the vehicle and having one end secured in said clamp.

2. In a snubber attachment for vehicles, a flat spring snubber arm adapted for attachment to the center portion of a vehicle flat leaf spring, the free end of the arm being rebent to form a clamp including a gripping arm lying parallel to the spring arm, said gripping arm being bent outwardly intermediate its ends to form a seat for receiving a flexible rebound limiting strap.

3. In a vehicle snubber, the combination with a flat leaf spring, of a flat metallic spring arm extending lengthwise of said spring and arranged on one side thereof, means for attaching the arm to the center portion of the leaf spring, the outer end of the arm being substantially co-extensive with one end of the leaf spring, and a flexible loop connecting the adjacent ends of the spring leaf and arm.

4. In a vehicle snubber, the combination with a flat leaf spring, of a flat metallic spring arm extending lengthwise of said spring and arranged on one side thereof, means for attaching the arm to the center portion of the leaf spring including means for retaining the arm against longitudinal movement relative to the leaf spring, the outer end of the arm being substantially co-extensive with one end of the leaf spring, and a flexible loop connecting the adjacent ends of the spring leaf and arm.

5. In a vehicle snubber, the combination with a flat leaf spring, of a flat metallic spring arm extending lengthwise of said spring and arranged on one side thereof, means for attaching the arm to the center portion of the leaf spring, the outer end of the arm being substantially co-extensive with one end of the leaf spring, the outer end of the spring arm being rebent to form a gripping arm, and a flexible strap looped around the leaf spring and spring arm and clamped to the latter by said gripping arm.

6. In a vehicle snubber, the combination with a flat leaf spring, of a flat metallic spring arm extending lengthwise of said spring and arranged on one side thereof, means for attaching the arm to the center portion of the leaf spring, the outer end of the arm being substantially co-extensive with one end of the leaf spring, the outer end of the spring arm being rebent to form a gripping arm having a seat provided with a roughened surface, and a flexible strap looped around the leaf spring and spring arm and having its end portions clamped in said seat by said gripping arm.

In testimony whereof I hereunto affix my signature.

JOHN CROUCH.